US008228653B2

(12) United States Patent
Vicente et al.

(10) Patent No.: US 8,228,653 B2
(45) Date of Patent: Jul. 24, 2012

(54) CIRCUIT BREAKERS WITH AUTOMATIC BREAKER RATING

(75) Inventors: Nataniel Barbosa Vicente, Prospect, KY (US); Sreenivasulu Reddy Devarapalli, Louisville, KY (US); Todd Elliott Greenwood, Pewee Valley, KY (US); Zubair Hameed, Louisville, KY (US); Brian Patrick Lenhart, Jr., Louisville, KY (US); Stephen James West, Louisville, KY (US)

(73) Assignee: General Electric Company, Schenectady, NY (US)

( * ) Notice: Subject to any disclaimer, the term of this patent is extended or adjusted under 35 U.S.C. 154(b) by 834 days.

(21) Appl. No.: 11/951,472

(22) Filed: Dec. 6, 2007

(65) Prior Publication Data

US 2009/0147424 A1 Jun. 11, 2009

(51) Int. Cl.
*H02H 9/02* (2006.01)
(52) U.S. Cl. .................................. 361/93.3; 361/93.1
(58) Field of Classification Search .............. 361/93.3
See application file for complete search history.

(56) References Cited

U.S. PATENT DOCUMENTS

| 3,761,778 | A | * | 9/1973 | Willard | 361/54 |
| 4,203,153 | A | * | 5/1980 | Boyd | 713/323 |
| 4,272,673 | A |   | 6/1981 | Semanaz et al. | |
| 4,428,022 | A | * | 1/1984 | Engel et al. | 361/96 |
| 4,809,125 | A | * | 2/1989 | Matsko et al. | 361/93.3 |
| 5,608,207 | A | * | 3/1997 | Allen et al. | 250/214 AG |
| 6,356,426 | B1 | * | 3/2002 | Dougherty | 361/102 |
| 6,545,534 | B1 | * | 4/2003 | Mehr | 330/69 |
| 2006/0072269 | A1 | * | 4/2006 | Staples | 361/93.1 |

OTHER PUBLICATIONS

Australian Office Action for Australian application No. 2008246254; Issued: Feb. 10, 2011; 2 pgs.
Mexican Office Action for Mexican Application No. MX/a/2008/015480—filed Dec. 4, 2008, which is related to the above-referenced application; 6 pgs.

* cited by examiner

*Primary Examiner* — Rexford Barnie
*Assistant Examiner* — Tien Mai
(74) *Attorney, Agent, or Firm* — Cantor Colburn LLP

(57) ABSTRACT

An electronic control for a circuit breaker with automatic breaker rating is disclosed. The electronic control includes a memory to store circuit breaker ratings, a breaker rating switch to select circuit breaker ratings, and a microprocessor operatively coupled to the breaker rating switch and the memory. The microprocessor is configured to interpret a selected circuit breaker rating of the breaker rating switch, set an amplifier gain adjustment for the circuit breaker based on the selected circuit breaker rating, and transmit the selected circuit breaker rating to the memory for storage in the memory.

21 Claims, 4 Drawing Sheets

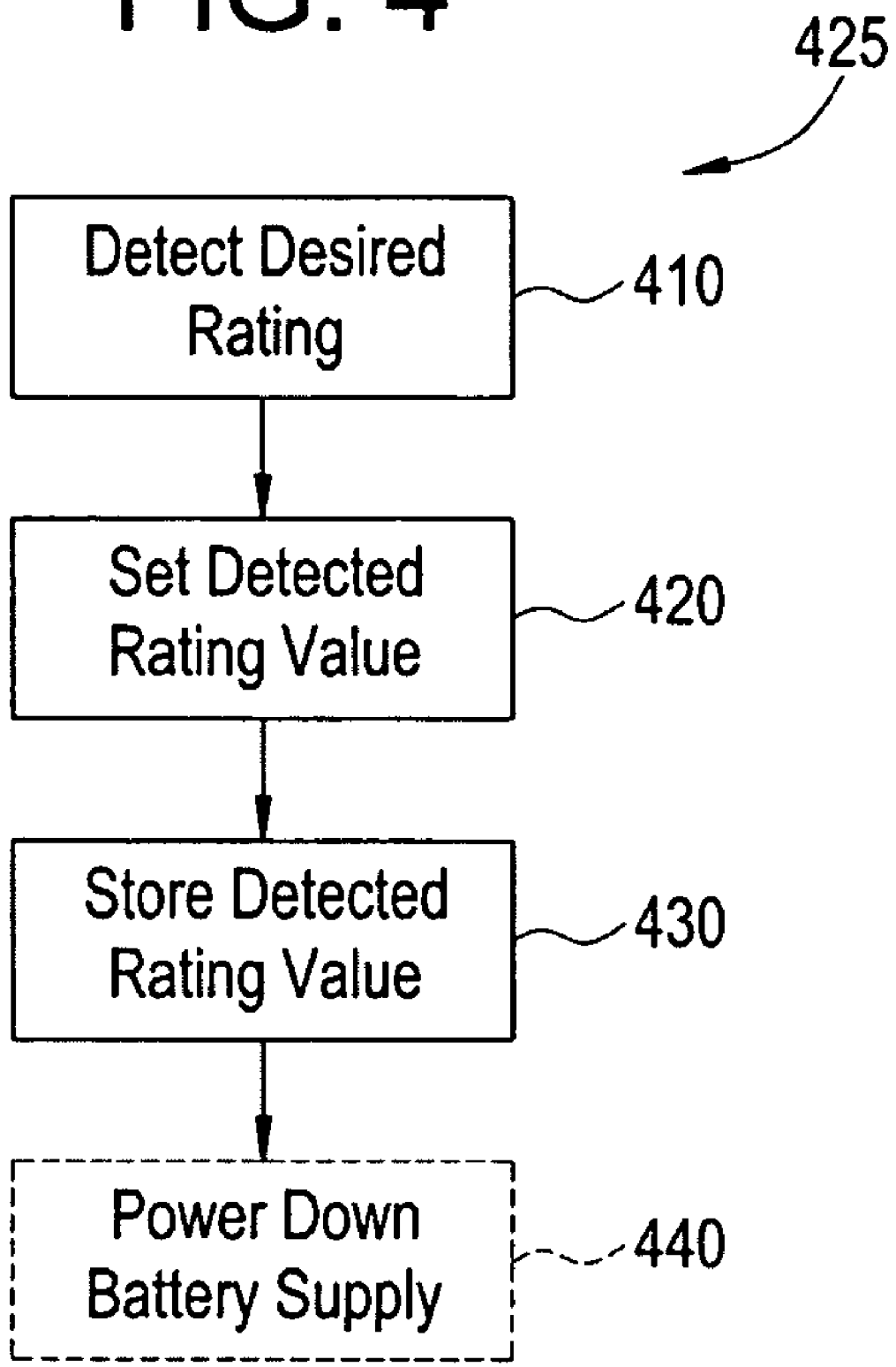

CIRCUIT BREAKERS WITH AUTOMATIC BREAKER RATING

BACKGROUND OF THE INVENTION

Embodiments of the invention generally relate to circuit breakers and electronic trip units, and more particularly to automatic breaker rating in circuit breakers and/or electronic trip units.

Circuit breakers may be used in industrial, commercial, and residential applications for protecting electrical devices from over-current situations. Circuit breakers, trip units, and/or electronic trip units with circuit breakers may measure electrical current of a load using a secondary current. The secondary current may be derived from the electrical current of the load through current transformers (CT) and/or Rogowski sensors. CTs and Rogowski sensors provide reduced current proportional to the electrical current of the load. The reduced current (noted secondary current above) may be used by the circuit breaker to perform protection analysis, metering, and other functionality included in the circuit breaker.

Circuit breakers may be used as a replacement for conventional fuses, although some circuit breakers function slower than fuses, and may include complicated mechanical components. However, fusing provides only a single level of protection. That is, fuses are generally non-adjustable. However, circuit breakers may be rated for many applications, and may be de-rated to increase breaker selectivity. For example, a circuit breaker rated to switch up to 100 amps may be adjusted to trip at 30 amps. However, this may require physically swapping rating plugs and setting internal gains for detection devices within the circuit breaker for the new trip setting. It is appreciated that this requires an operator to identify and adjust the de-rating current level as necessary for each application, save these setting in the circuit breaker (or trip unit), and test to ensure proper and accurate current level tripping.

Accordingly, there is a need in the art for an electronic control of a circuit breaker having an adjustable breaker rating that overcomes these drawbacks.

BRIEF DESCRIPTION OF THE INVENTION

An embodiment of the invention includes an electronic control for a circuit breaker with automatic breaker rating. The electronic control includes a memory to store circuit breaker ratings, a breaker rating switch to select circuit breaker ratings, and a microprocessor operatively coupled to the breaker rating switch and the memory. The microprocessor is configured to interpret a selected circuit breaker rating of the breaker rating switch, set an amplifier gain adjustment for the circuit breaker based on the selected circuit breaker rating, and transmit the selected circuit breaker rating to the memory for storage in the memory.

Another embodiment of the invention includes a method of automatic rating of a circuit breaker. The method includes detecting a desired circuit breaker rating at a microprocessor, the desired circuit breaker rating input at a breaker rating switch, setting an amplifier gain adjustment for the circuit breaker based on the desired circuit breaker rating, and storing the desired circuit breaker rating in a memory of the circuit breaker.

BRIEF DESCRIPTION OF THE DRAWINGS

These and other features, aspects, and advantages of the present invention will become better understood as the following detailed description is read with reference to the accompanying drawings in which like reference numerals represent like elements throughout the drawings, wherein:

FIG. 4 is a flowchart of a method of automatic rating of a circuit breaker, in accordance with an example embodiment of the present invention.

DETAILED DESCRIPTION OF THE INVENTION

Figure 1:
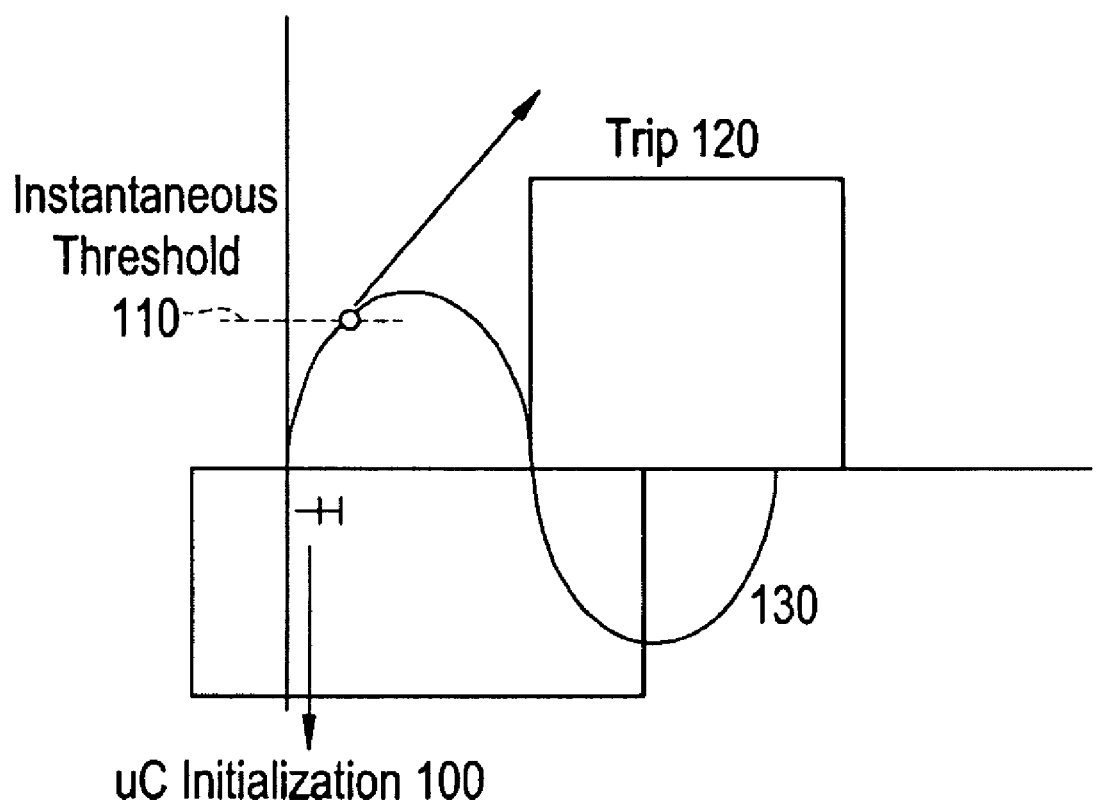
FIG. 1 is a diagram of an alternating waveform depicting an example trip point.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. According to example embodiments, electronic controls of circuit breakers with automatic breaker rating are disclosed. Similarly, methods of automatic breaker rating are disclosed. Turning to FIG. 1, an alternating waveform depicting an example trip point is described. Thereafter, electronic controls of circuit breakers with automatic detection of breaker ratings are described in detail.

FIG. 1 is a diagram of an alternating waveform depicting an example trip point. As illustrated in FIG. 1, one cycle of an alternating waveform 130 is illustrated. For example, waveform 130 may be an alternating current or an alternating voltage waveform. As the waveform 130 reaches instantaneous threshold 110, a circuit breaker monitoring waveform 130 trips as illustrated by trip curve 120. According to example embodiments, adjustment of thresholds and/or ratings may be applied automatically by exemplary circuit breakers disclosed herein. Hereinafter, a more detailed description of an exemplary electronic control of a circuit breaker with automatic breaker rating is given with reference to FIG. 2.

Figure 2:
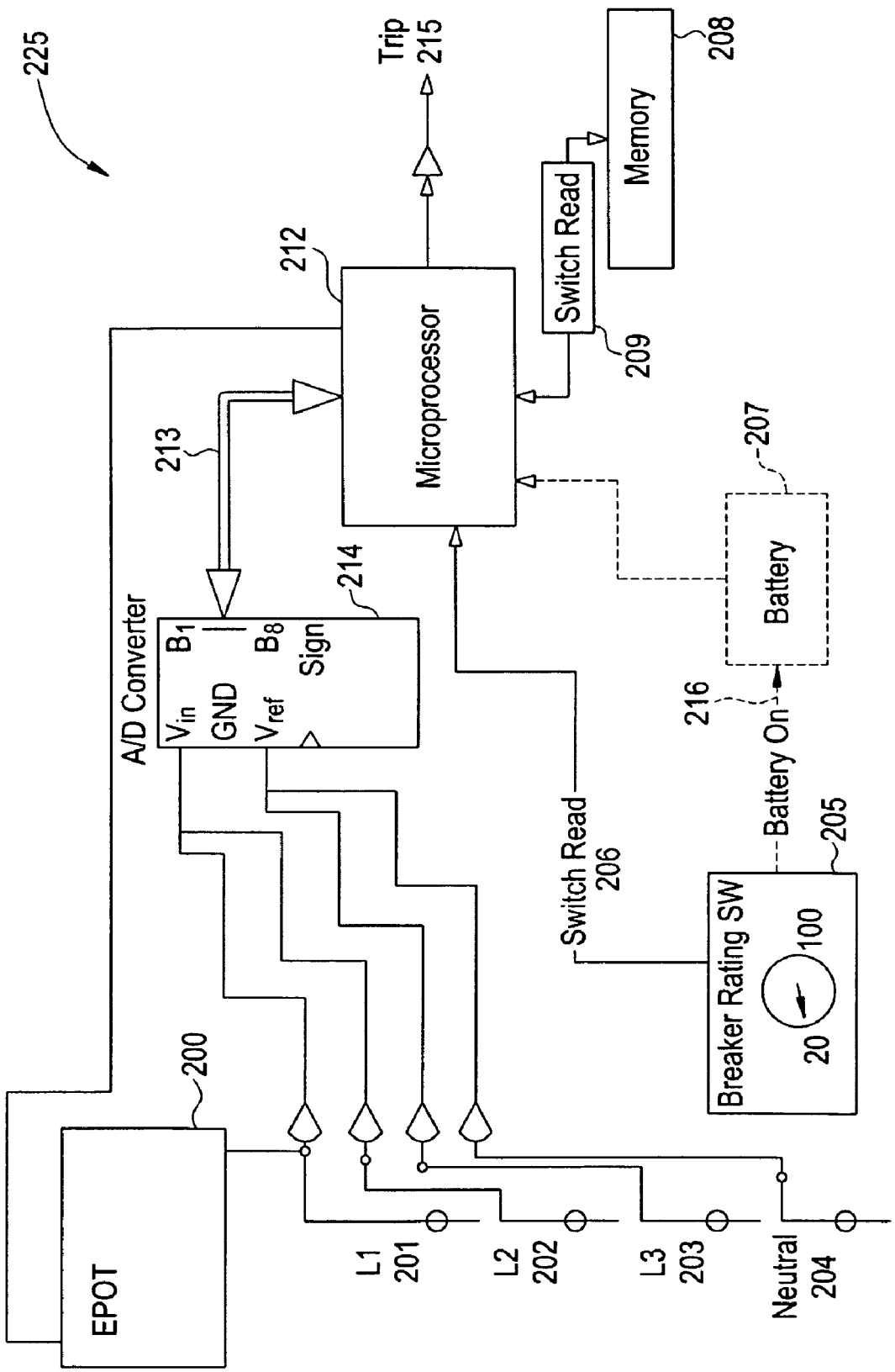
FIG. 2 is a block diagram of an exemplary electronic control, in accordance with an example embodiment of the present invention.

FIG. 2 is a block diagram of an exemplary electronic control, in accordance with an example embodiment of the present invention. Electronic control 225 may be included in a circuit breaker, to allow automatic circuit breaker rating as described herein. A circuit breaker is an electrical device designed to protect electrical equipment from damage caused by faults in a circuit. Circuit breakers include an operating mechanism for opening and closing a conduction path to a load. The mechanism may be mechanical based switches, or solid state devices, although other alternatives are also applicable. The operating mechanism is in communication with an electronic trip unit, or at least an electronic detection unit capable of detecting current conditions on the conduction path. The electronic trip unit is responsive to current conditions on the conduction path, and may direct the operating mechanism to open or close the conduction path based on the current conditions. For example, during or in response to an over-current condition, the electronic trip unit may direct the operating mechanism to open the conduction path, thereby stopping or limiting the flow of current to the load. For example, an electronic trip unit may include the electronic control 225 described hereinabove, or the electronic control 225 may be separately included in the circuit breaker. Hereinafter, a more detailed description of the operative components of electronic control 225 is given with reference to FIG. 2.

As illustrated in FIG. 2, electronic control 225 includes breaker rating switch 205. Breaker rating switch 205 may be a rotary type switch for inputting a desired rating through rotation of a knob or axle, or may be a switch bank with a plurality of different settings. As used herein, a desired rating of a circuit breaker refers to the full (100%) ampere rating of the circuit depending on the cable size used in an installation, such as 100 Amp rating for 1 AWG wiring, or 50 Amp rating for 6 AWG wiring. For example, a rotary type switch may allow a user to select a rating based on a percentage of available circuit breaker ratings. Such an example may be a selection between zero to one-hundred percent of available rating. A switch bank may include a predetermined or desired set of available ratings. Such an example may include switches for increasing the rating based on a percentage or amperage rating available to the circuit breaker.

Further illustrated in FIG. 2 is microprocessor 212. Microprocessor 212 is operatively coupled to breaker rating switch 205 over switch connection 206, and thus may interpret the setting of breaker rating switch 205. For example, a user may turn or alter the selection on breaker rating switch 205, the microprocessor may detect this change in state, and read the new selection of breaker rating. According to at least one example embodiment, a change in state of breaker rating switch 205 activates battery 207. Activation and/or deactivation may be employed through use of battery connection 216. Battery 207 is an optional power source and should not be limiting of example embodiments. If battery 207 is activated, it may power microprocessor 212, and allow microprocessor 212 to interpret the state of breaker selection switch 205. Alternatively, the electronic control 225 may include an external power source, or may derive power from any of phase lines L1 201, L2 202, and L3 203 using phase differential powering techniques. Phase line 204 is neutral, and may be tied to phase line L3 203.

It is noted that although a three-phase implementation of electronic control 225 has been described above, single-phase or direct current implementations are also applicable to example embodiments.

Because microprocessor 212 may interpret settings input at breaker rating switch 205, it may further use these settings in altering the rating of the electronic control 225. For example, memory 208 is operatively coupled to microprocessor 212 over memory connection 209. Microprocessor 212 may thus store new settings input at breaker rating switch 205 for use in operation of the electronic control 225. Furthermore, microprocessor 212 is operatively coupled to electronic potentiometer 200. Therefore, microprocessor 212 may set the amplifier gain of the electronic control 225 through adjusting electronic potentiometer 200. As such, settings input at breaker rating switch 205 may be interpreted by microprocessor 212, set in the electronic potentiometer 200, and stored in memory 208. In at least one example embodiment, memory 208 is non-volatile. Therefore, even if there is lack of external or battery power, settings may be stored for long periods of time.

Further illustrated in FIG. 2 is analog-to-digital converter (ADC) 214. ADC 214 is operatively coupled to microprocessor 212. ADC 214 may sense a current derived from a load connected to the electronic control 225, and may transmit information based upon the sensed current to microprocessor 212 over communication bus 213. Although illustrated as an eight-bit bus, communication bus 213 may include more or less bits, or may equally be embodied as a serial communication bus, without departing from example embodiments.

If the sensed current exceeds a threshold for a circuit breaker including electronic control 225, microprocessor 212 may transmit a trip signal 215 such that the circuit breaker is tripped. However, it is noted that the trip signal may not actually control the tripping of the circuit breaker, as it may be embodied as a signal to communicate to an external device that the electronic control 225 has been tripped. Thus, mechanical or other tripping means may be employed in addition to the trip signal 215 to physically stop the flow of current to a load on a circuit breaker including electronic control 225.

Thus, as described above, an embodiment of the invention includes an electronic control of a circuit breaker with automatic breaker rating. The electronic control includes a memory to store circuit breaker ratings, a breaker rating switch to select circuit breaker ratings, and a microprocessor operatively coupled to the breaker rating switch and the memory. The microprocessor is configured to interpret a selected circuit breaker rating of the breaker rating switch, set an amplifier gain adjustment for the circuit breaker based on the selected circuit breaker rating, and transmit the selected circuit breaker rating to the memory for storage in the memory. Hereinafter, another example embodiment of the present invention is described in detail with reference to FIG. 3

Figure 3:
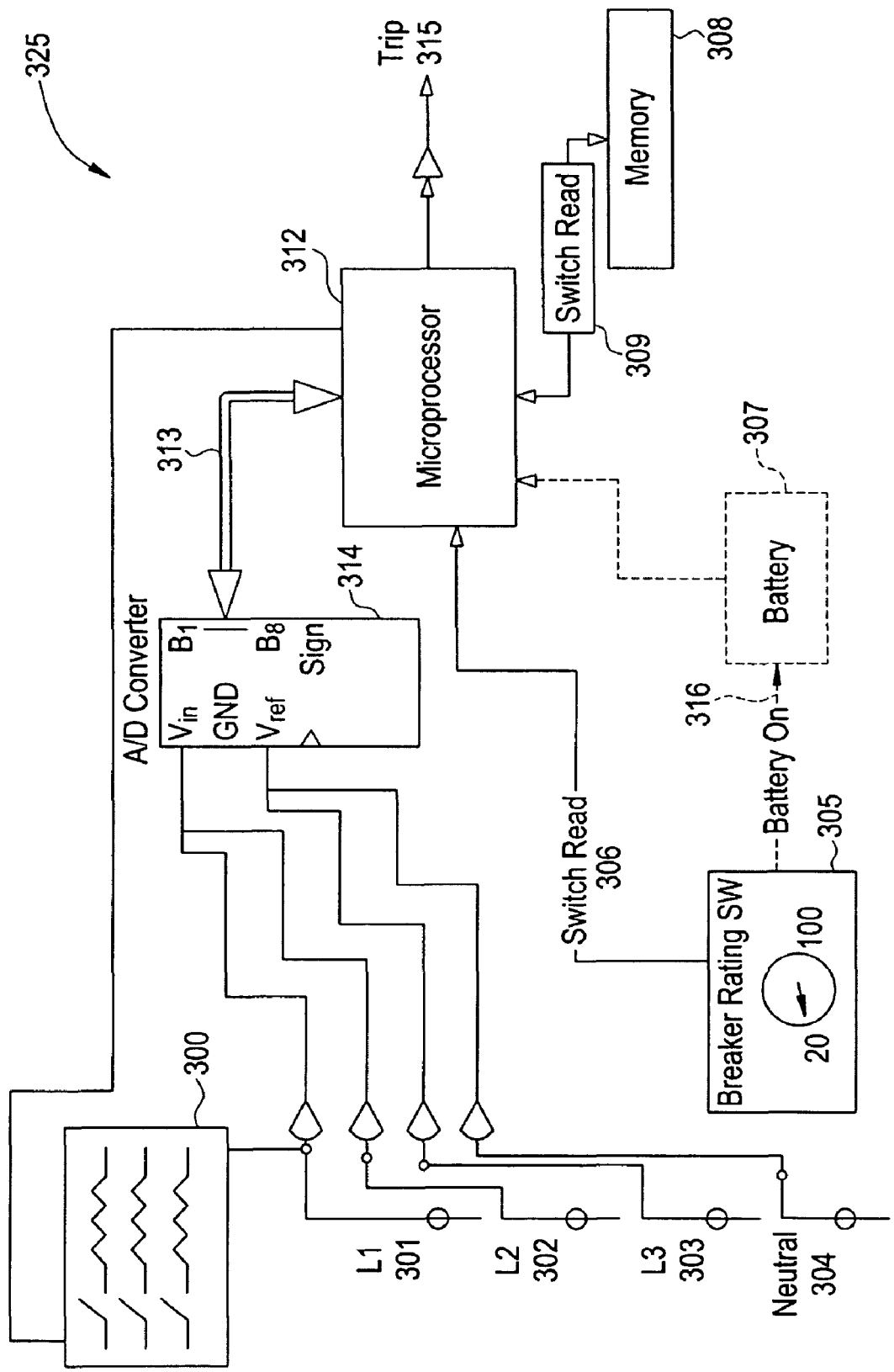
FIG. 3 is a block diagram of an exemplary electronic control, in accordance with an example embodiment of the present invention.

FIG. 3 is a block diagram of an exemplary electronic control, in accordance with an example embodiment of the present invention. As apparent in FIG. 3, the inclusion of resistive switch network 300 is the main difference between the example embodiments described in FIGS. 2 and 3. For example, A/D converter 314, microprocessor 312, breaker rating switch 305, and memory 308 may be similar or substantially similar to those elements described in reference to FIG. 2. Therefore, exhaustive description of similar components and their operation will be omitted herein for the sake of brevity.

Turning now to FIG. 3, it is noted that microprocessor 312 may interpret setting input at breaker rating switch 305. Because microprocessor 312 may interpret settings input at breaker rating switch 305, it may further use these settings in altering the rating of the electronic control 325. For example, memory 308 is operatively coupled to microprocessor 312 over memory connection 309. Microprocessor 312 may thus store new settings input at breaker rating switch 305 for use in operation of the electronic control 325. Furthermore, microprocessor 312 is operatively coupled to resistive switch network 300. Therefore, microprocessor 312 may set the amplifier gain of the electronic control 225 through adjusting switches of the resistive switch network 300. As such, settings input at breaker rating switch 305 may be interpreted by microprocessor 312, set in the resistive switch network 300, and stored in memory 308. In at least one example embodiment, memory 308 is non-volatile. Therefore, even if there is lack of external or battery power, settings may be stored for long periods of time.

Further illustrated in FIG. 3 is analog-to-digital converter (ADC) 314. ADC 314 is operatively coupled to microprocessor 312. ADC 314 may sense a current derived from a load connected to the electronic control 325, and may transmit information based upon the sensed current to microprocessor 312 over communication bus 313. Although illustrated as an eight-bit bus, communication bus 313 may include more or less bits, or may equally be embodied as a serial communication bus, without departing from example embodiments.

If the sensed current exceeds a threshold for a circuit breaker including electronic control 325, microprocessor 312 may transmit a trip signal 315 such that the circuit breaker is tripped.

Thus, as described above, an embodiment of the invention includes an electronic control of circuit breaker with automatic breaker rating. The electronic control includes a memory to store circuit breaker ratings, a breaker rating switch to select circuit breaker ratings, and a microprocessor operatively coupled to the breaker rating switch and the memory. The microprocessor is configured to interpret a selected circuit breaker rating of the breaker rating switch, set an amplifier gain adjustment for the circuit breaker based on the selected circuit breaker rating, and transmit the selected circuit breaker rating to the memory for storage in the memory. However, example embodiments of the present inventions are not limited to circuit breakers alone. Hereinafter, a more detailed description of a method of automatic rating of a circuit breaker is given with reference to FIG. 4.

FIG. 4 is a flowchart of a method of automatic rating of a circuit breaker, in accordance with an example embodiment of the present invention. According to method 425, a desired rating for a circuit breaker is detected at step 410. For example, a microprocessor may detect the desired rating. Further, the desired rating may be input by a breaker rating selection switch, for example. The microprocessor and rating selection switch may be similar, or substantially similar, to those described hereinabove.

Upon detection of the desired breaker rating for the circuit breaker, the detected rating value is set in step 420. For example, the detected rating value may be set in an electric potentiometer and/or resistive switch network such as described hereinbefore. Therefore, a detected desired rating value may be automatically set in a circuit breaker according to method 425.

Further disclosed in method 425 is storing the detected rating value in step 430. For example, the detected rating value may be stored in a microprocessor's registers or a memory. The memory may be non-volatile or otherwise, or may be substantially similar to the memory described hereinbefore.

If the circuit breaker implementing and/or using the method 425 includes a battery source for power during the methodology, it may be powered down at step 440. For example, upon a change in state of a breaker rating selection switch, a battery power source may be activated. Thereafter, a microprocessor may interpret a desired rating, set the desired rating, store the desired rating, and subsequently, the battery power source may be inactivated.

Thus, as described above, embodiments of the invention include a method of automatic rating of a circuit breaker. The method includes detecting a desired circuit breaker rating at a microprocessor, the desired circuit breaker rating input at a breaker rating switch, setting an amplifier gain adjustment for the circuit breaker based on the desired circuit breaker rating, and storing the desired circuit breaker rating in a memory of the circuit breaker.

As described hereinbefore, example embodiments of the present invention provide electronic controls of circuit breakers with automatic breaker rating. Furthermore, example embodiments of the present invention provide methods of automatic rating of circuit breakers. With only some example embodiments of the present invention having thus been described, it will be obvious that the same may be varied in many ways. Such variations are not to be regarded as a departure from the spirit and scope of the present invention, and all such modifications are intended to be included within the scope of the present invention as stated in the following claims.

What is claimed is:

1. An electronic control for a circuit breaker with automatic breaker rating, comprising:
    a memory to store circuit breaker ratings, wherein each circuit breaker rating of the circuit breaker ratings is a different ampere rating of maximum current to be allowed to flow through the circuit breaker;
    a breaker rating switch to select the circuit breaker ratings stored in the memory; and
    a microprocessor operatively coupled to the breaker rating switch and the memory, wherein the microprocessor is configured to:
        interpret a rating of the circuit breaker ratings selected by the breaker rating switch;
        set an amplifier gain adjustment for the circuit breaker based on the selected circuit breaker rating; and
        transmit the selected circuit breaker rating to the memory.

2. The electronic control of claim 1, further comprising:
    an electronic potentiometer operatively coupled to the microprocessor to set the amplifier gain adjustment.

3. The electronic control of claim 1, further comprising:
    a resistive switch network operatively coupled to the microprocessor to set the amplifier gain adjustment.

4. The electronic control of claim 1, further comprising:
    a battery operatively coupled to the breaker rating switch and the microprocessor to power the microprocessor during circuit breaker rating selection.

5. The electronic control of claim 4, wherein the battery is activated upon a change of state of the breaker rating switch.

6. The electronic control of claim 4, wherein the battery is activated if there is a lack of external power supplied to the circuit breaker.

7. The electronic control of claim 4, wherein the battery is deactivated upon storage of the selected circuit breaker rating.

8. The electronic control of claim 1, further comprising:
an analog-to-digital converter operatively coupled to the microprocessor to provide current level readings derived from a load current controlled by the circuit breaker.

9. The electronic control of claim 1, wherein the memory is non-volatile memory.

10. The electronic control of claim 1, wherein the breaker rating switch is a rotary switch for manual selection of a desired rating of the circuit breaker ratings.

11. The electronic control of claim 10, wherein the rotary switch includes a knob adjustment portion allowing selection of a percentage of an available circuit breaker rating of the circuit breaker ratings.

12. The electronic control of claim 1, wherein the breaker rating switch is a switch bank for manual selection of a set of predetermined ratings of the circuit breaker ratings.

13. The electronic control of claim 1, wherein the circuit breaker is a three-phase circuit breaker.

14. The electronic control of claim 1, wherein the circuit breaker is a single-phase circuit breaker.

15. The electronic control of claim 1, wherein the microprocessor includes a circuit breaker trip output to signal tripping of the circuit breaker.

16. A method of automatic rating of a circuit breaker, comprising:
detecting a desired circuit breaker rating at a microprocessor, the desired circuit breaker rating being input at a breaker rating switch, wherein the desired circuit breaker rating is an ampere rating of desired maximum current to be allowed to flow through the circuit breaker;
setting an amplifier gain adjustment for the circuit breaker based on the desired circuit breaker rating; and
storing the desired circuit breaker rating in a memory of the circuit breaker.

17. The method of claim 16, further comprising:
activating battery power of the circuit breaker upon a change of state of the breaker rating switch; and
deactivating battery power upon storage of the desired circuit breaker rating in the memory.

18. The method of claim 16, further comprising:
transmitting a trip signal from the microprocessor based on a derived current level exceeding a current breaker rating setting.

19. The method of claim 16, wherein:
the amplifier gain adjustment is set on one of an electronic potentiometer and a resistive switch network operatively coupled to the microprocessor.

20. The method of claim 16, wherein the memory is non-volatile memory.

21. An electronic control for a circuit breaker, comprising:
a memory to store circuit breaker ratings, wherein each circuit breaker rating of the circuit breaker ratings is a different full ampere rating of maximum current to be allowed to flow through the circuit breaker;
a breaker rating switch to select the circuit breaker ratings stored in the memory; and
a microprocessor operatively coupled to the breaker rating switch and the memory, wherein the microprocessor is configured to:
interpret a circuit breaker rating selected by the breaker rating switch;
set a full ampere rating of the circuit breaker to the interpreted circuit breaker rating; and
transmit the interpreted circuit breaker rating to the memory.

* * * * *